(12) United States Patent
Tucker et al.

(10) Patent No.: US 9,096,327 B2
(45) Date of Patent: Aug. 4, 2015

(54) AIRCRAFT HEALTH ASSESSMENT SYSTEM

(71) Applicant: Bell Helicopter Textron Inc., Fort Worth, TX (US)

(72) Inventors: Brian E. Tucker, Fort Worth, TX (US); Stephen R. Johnston, Fort Worth, TX (US)

(73) Assignee: Bell Helicopter Textron Inc., Fort Worth, TX (US)

( * ) Notice: Subject to any disclaimer, the term of this patent is extended or adjusted under 35 U.S.C. 154(b) by 271 days.

(21) Appl. No.: 13/770,039

(22) Filed: Feb. 19, 2013

(65) Prior Publication Data

US 2014/0200746 A1 Jul. 17, 2014

Related U.S. Application Data

(60) Provisional application No. 61/753,256, filed on Jan. 16, 2013.

(51) Int. Cl.
*B64D 45/00* (2006.01)
*G01M 5/00* (2006.01)
*G07C 5/00* (2006.01)
*G05B 23/02* (2006.01)

(52) U.S. Cl.
CPC ............ *B64D 45/00* (2013.01); *G01M 5/0033* (2013.01); *G05B 23/0283* (2013.01); *G07C 5/006* (2013.01)

(58) Field of Classification Search
CPC ...................................................... B64D 45/00
See application file for complete search history.

(56) References Cited

U.S. PATENT DOCUMENTS

2011/0264310 A1* 10/2011 Bates et al. ...................... 701/14
2011/0313614 A1 12/2011 Hinnant, Jr. et al.
2013/0274989 A1* 10/2013 Isom et al. .................. 701/31.4

FOREIGN PATENT DOCUMENTS

EP 2384971 A1 11/2011

OTHER PUBLICATIONS

Shenliang Wu et al., A Practical Regime Prediction Approach for HUMS Applications, American Helicopter Society 63rd Annual Forum, May 1-3, 2007.
G.L. Graham, Combat Operational Flight Profiles on the UH-1C, AH-1G, and UH-1H Helicopters, American Helicopter Society 26th Annual Forum, Jun. 1970.
Charles Miller, Maneuver Regime Recognition Development and Verification for H-60 Structural Monitoring, American Helicopter Society 63rd Annual Forum, May 1-3, 2006.
(Continued)

*Primary Examiner* — Helal A Algahaim
*Assistant Examiner* — Kelly D Williams
(74) *Attorney, Agent, or Firm* — Bell Helicopter Textron Inc.

(57) ABSTRACT

According to one embodiment, a system for assessing health of an aircraft includes a receiver, a flight spectrum analyzer, and a health assessment analyzer. The receiver receives, from an aircraft, a plurality of measurements associated with two or more flight parameters. The plurality of measurements includes measurements spanning at least one period of time. The flight spectrum analyzer determines, based on a comparison of the plurality of measurements to a plurality of flight spectrum definitions, an amount of time the aircraft spent in each flight spectrum of a plurality of flight spectrums during the at least one period of time. The health assessment analyzer assesses a change in health of the aircraft over the at least one period of time based on the determination of the amount of time the aircraft spent in each flight spectrum and a plurality of spectrum health profiles.

20 Claims, 7 Drawing Sheets

(56) References Cited

OTHER PUBLICATIONS

Yi Lu et al., AH-64D Apache Longbow Structural Usage Monitoring System, American Helicopter Society 58th Annual Forum, Jun. 11-13, 2002.

Richard S. Teal et al., Regime Recognition for MH-47E Structural Usage Monitoring, American Helicopter Society 53rd Annual Forum, Apr. 29 to May 1, 1997.

Preston R. Bates et al., Rotorcraft Dynamic Component Usage Based Maintenance Process, American Helicopter Society 66th Annual Forum, May 11-13, 2010.

John Berry et al., Automatic Regime Recognition Using Neural Networks, American Helicopter Society 60th Annual Forum, May 9-11, 2006.

Gene L. Brandt et al., Development of a Fatigue Tracking Program for Navy Rotary Wing Aircraft, American Helicopter Society 50th Annual Forum, May 11-13, 1994.

Extended Search Report in related European Application No. 13162135.1, dated Sep. 18, 2014 pages.

Rule 71(3) Communication in related European Application No. 13162135.1, dated Mar. 9, 2015, 37 pages.

James Michael et al., Continued Evaluation and Spectrum Development of a Health and Usage Monitoring System, May 2004, DOT/FAA/AR-04/6, U.S. Department of Transportation, Federal Aviation Administration, available at http://www.faa.gov/about/office_org/headquarters_offices/ang/offices/ac_td/aa_safety/airworthiness_assurance/structural_integrity/reports/media/pdf/Continued%20Eval_Spectrum.pdf.

* cited by examiner

AIRCRAFT HEALTH ASSESSMENT SYSTEM

RELATED APPLICATIONS

Pursuant to 35 U.S.C. §119 (e), this application claims priority to U.S. Provisional Patent Application Ser. No. 61/753,256, entitled AIRCRAFT HEALTH ASSESSMENT SYSTEM, filed Jan. 16, 2013. U.S. Provisional Patent Application Ser. No. 61/753,256 is hereby incorporated by reference.

GOVERNMENT RIGHTS

At least some of the subject matter of this patent application was made with government support under OSST TIA W911W6-07-2-0003 awarded by the United States Army Aviation Applied Technology Directorate. The government may have certain rights in the invention.

TECHNICAL FIELD

This invention relates generally to aircraft health, and more particularly, to an aircraft health assessment system.

BACKGROUND

An aircraft may perform a variety of different missions. Some missions may subject the aircraft to more stress than other missions. For example, some missions may include high-stress maneuvers, whereas other missions may focus primarily on straight-and-level flight.

One example of an aircraft is a rotorcraft. A rotorcraft may include one or more rotor systems. One example of a rotorcraft rotor system is a main rotor system. A main rotor system may generate aerodynamic lift to support the weight of the rotorcraft in flight and thrust to counteract aerodynamic drag and move the rotorcraft in forward flight. Another example of a rotorcraft rotor system is a tail rotor system. A tail rotor system may generate thrust in the same direction as the main rotor system's rotation to counter the torque effect created by the main rotor system.

SUMMARY

Particular embodiments of the present disclosure may provide one or more technical advantages. A technical advantage of one embodiment may include the capability to estimate changes in health of an aircraft (or an aircraft part) based on a limited number of flight parameter measurements. A technical advantage of one embodiment may include the capability to select and prioritize flight parameters that are more predictive of changes in health of an aircraft (or an aircraft part). A technical advantage of one embodiment may include the capability to estimate changes in health of an aircraft (or an aircraft part) without assuming a worst-case design spectrum. A technical advantage of one embodiment may include the capability to improve economics of operating an aircraft by delaying retirement of some parts.

Certain embodiments of the present disclosure may include some, all, or none of the above advantages. One or more other technical advantages may be readily apparent to those skilled in the art from the figures, descriptions, and claims included herein.

BRIEF DESCRIPTION OF THE DRAWINGS

To provide a more complete understanding of the present invention and the features and advantages thereof, reference is made to the following description taken in conjunction with the accompanying drawings, in which.

DETAILED DESCRIPTION OF THE DRAWINGS

Figure 1:
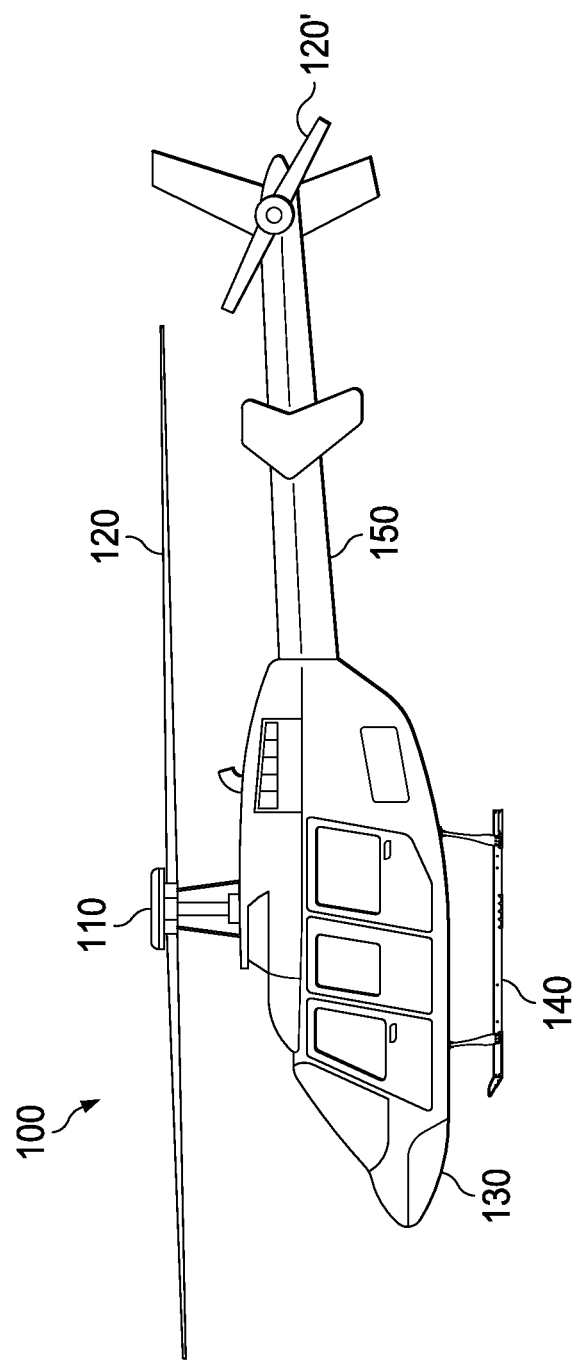
FIG. 1 shows a rotorcraft according to one example embodiment.

FIG. 1 shows a rotorcraft 100 according to one example embodiment. Rotorcraft 100 features a rotor system 110, blades 120, a fuselage 130, a landing gear 140, and an empennage 150. Rotor system 110 may rotate blades 120. Rotor system 110 may include a control system for selectively controlling the pitch of each blade 120 in order to selectively control direction, thrust, and lift of rotorcraft 100. Fuselage 130 represents the body of rotorcraft 100 and may be coupled to rotor system 110 such that rotor system 110 and blades 120 may move fuselage 130 through the air. Landing gear 140 supports rotorcraft 100 when rotorcraft 100 is landing and/or when rotorcraft 100 is at rest on the ground. Empennage 150 represents the tail section of the aircraft and features components of a rotor system 110 and blades 120'. Blades 120' may provide thrust in the same direction as the rotation of blades 120 so as to counter the torque effect created by rotor system 110 and blades 120. Teachings of certain embodiments relating to rotor systems described herein may apply to rotor system 110 and/or other rotor systems, such as other tilt rotor and helicopter rotor systems. It should also be appreciated that teachings regarding rotorcraft 100 may apply to aircraft and vehicles other than rotorcraft, such as airplanes and unmanned aircraft, to name a few examples.

Rotorcraft 100 may perform a variety of different missions. Some missions may subject rotorcraft 100 to more stress than other missions. For example, some missions may include high-stress flight modes (e.g., a high-speed turn with a high bank angle), whereas other missions may focus primarily on lower-stress flight modes (e.g., straight-and-level flight). A flight mode may include any operating condition of an aircraft, including any scenario that could potentially change the health of an aircraft. Some flight modes may be defined broadly (e.g., rotorcraft hover), whereas other flight modes may be defined narrowly (e.g., a specific turn at specific angles in specific environmental conditions, etc.).

In an effort to improve safety and performance of rotorcraft 100, routine inspections may be scheduled to determine whether parts associated with rotorcraft 100 need repair and/or replacing. Scheduling such inspections, however, may require an understanding of how much stress rotorcraft 100 is subject to over time as well as how quickly parts associated with rotorcraft 100 wear down in response to such stress.

Figure 2A:
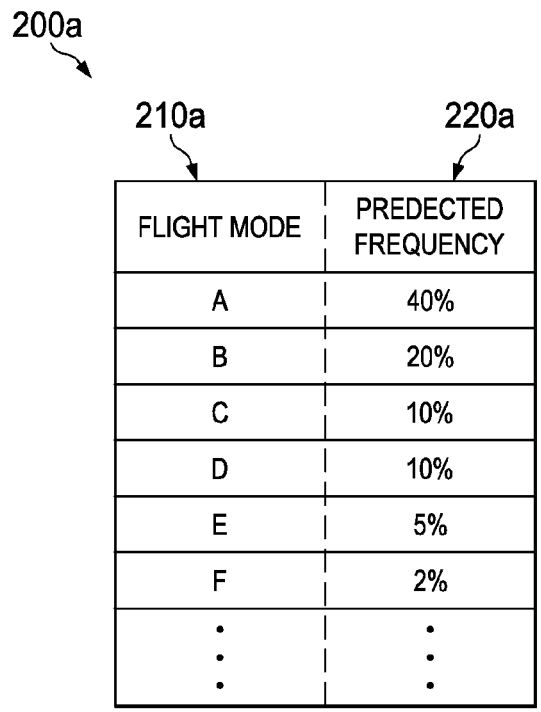
FIG. 2A shows one example technique for determining how much stress an aircraft such as the rotorcraft of FIG. 1 is subject to over time.

FIG. 2A shows one example technique for determining how much stress rotorcraft 100 is subject to over time. In the example of FIG. 2A, stress is estimated based on predicted missions of rotorcraft 100. The predicted missions may include a variety of different flight modes (e.g., straight-and-level flight, maneuvers, etc.). The example of FIG. 2A predicts that rotorcraft 100 will operate in flight mode A forty percent of the time, flight mode B twenty percent of the time, and so on. Each predicted flight mode may be associated with a certain amount of stress, which may allow stress on rotorcraft 100 to be predicted as a function of time (e.g., flight hours).

The predictions used in the technique of FIG. 2A, however, may be somewhat inaccurate for some aircraft. For example, in some cases, missions of rotorcraft 100 may be predicted before rotorcraft 100 ever takes flight (e.g., during design of rotorcraft 100). For example, the manufacturer may assume that every customer will use rotorcraft 100 to perform certain missions and assume that these missions will include certain flight modes. But each customer may use rotorcraft 100 differently. In particular, some customers may fly rotorcraft 100 more aggressively and subject rotorcraft 100 to more stress.

In response, manufacturers may improve safety by assuming that every customer will fly their rotorcraft 100 aggressively and predicting flight modes based on this assumption. This approach, however, may result in unnecessary inspections and unnecessarily-early retirement of life-limited parts for those customers who do not fly aggressively. In addition, this approach may result in over-engineering of parts: the manufacturer may design certain parts to withstand stresses that most customers will not subject their rotorcraft 100 to.

Thus, although aircraft such as rotorcraft 100 may be safely designed and flown by predicting stress based on predicted aircraft missions, such an approach may not necessarily be efficient. Accordingly, teachings of certain embodiments recognize the capability to assess aircraft stress based on data from actual aircraft missions rather than predicted aircraft missions.

Figure 2B:
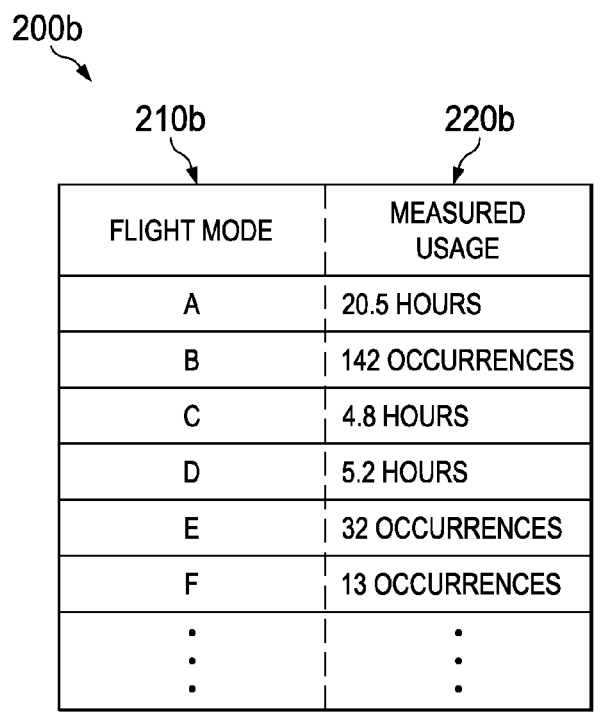
FIG. 2B shows an alternative example technique for determining how much stress an aircraft such as the rotorcraft of FIG. 1 is subject to over time.

FIG. 2B shows an alternative example technique for determining how much stress rotorcraft 100 is subject to over time. In the example of FIG. 2B, each rotorcraft 100 is equipped with a variety of flight measurement sensors. Each flight measurement sensor may measure one or more facets of aircraft performance (e.g., airspeed, density altitude, bank angle, etc.). Stress on a rotorcraft 100 may be calculated based on the measurements received from the flight measurement sensors located on that rotorcraft 100. In the example of FIG. 2B, the actual frequency of each flight mode is calculated based on the received measurements. As seen in the example of FIG. 2B, one rotorcraft 100 operated for 20.5 hours in flight mode A, performed flight mode B 142 times, operated in flight mode C for 4.8 hours, and so on. Similar to the technique of FIG. 2A, each flight mode may be associated with a certain amount of stress, which may allow stress on rotorcraft 100 to be predicted as a function of actual flight mode occurrences.

The technique of FIG. 2B, however, may be overly cumbersome. For example, many different types of measurement sensors may be required to collect all the information necessary to calculate flight modes. In one example, thirty or forty different types of measurement sensors may be required to provide all the different types of data necessary to perform the calculators of the technique of FIG. 2B. In addition, redundant sensors may be required to protect against failures of the primary measurement sensors. Each of these required measurement sensors may add unwanted weight and bulk to the aircraft.

In addition, although it may be possible to calculate each flight mode based on all of these measurements, the technique may not be feasible due to the volume of data and the required processing power. Returning to the previous example, measurements for just one hour of flight time for one aircraft may result in thousands of data points (e.g., 108,000 data points for thirty measurement sensors sampling once per second). Calculating every flight mode for just one hour of flight time for one rotorcraft based these on measurements may require an incredible amount of processing power due to the volume of data and the complexity of the calculations. The problem is multiplied when calculating flight modes for multiple aircraft (e.g., a fleet of aircraft or every aircraft within a product line) over the course of their lifetimes.

Furthermore, the technique of FIG. 2B may also result in data gaps. In particular, the technique of FIG. 2B may not account for activities occurring between known flight modes. For example, an aircraft may transition from straight-and-level flight at a first altitude to a straight-and-level flight at a second altitude, but the technique of FIG. 2B may not assess the stress associated with the transition if the transition is not an already-recognized flight mode.

Teachings of certain embodiments recognize the capability to assess aircraft stress based on a limited amount of data from actual aircraft missions. For example, teachings of certain embodiments recognize the ability to estimate flight modes based on a limited number of flight parameters (e.g., 2-5 flight parameters). Each flight parameter may measure one facet of aircraft conditions and/or operation (e.g., airspeed, density altitude, bank angle, etc.). Teachings of certain embodiments recognize the capability select and prioritize flight parameters that are more predictive of flight modes.

Figure 3:
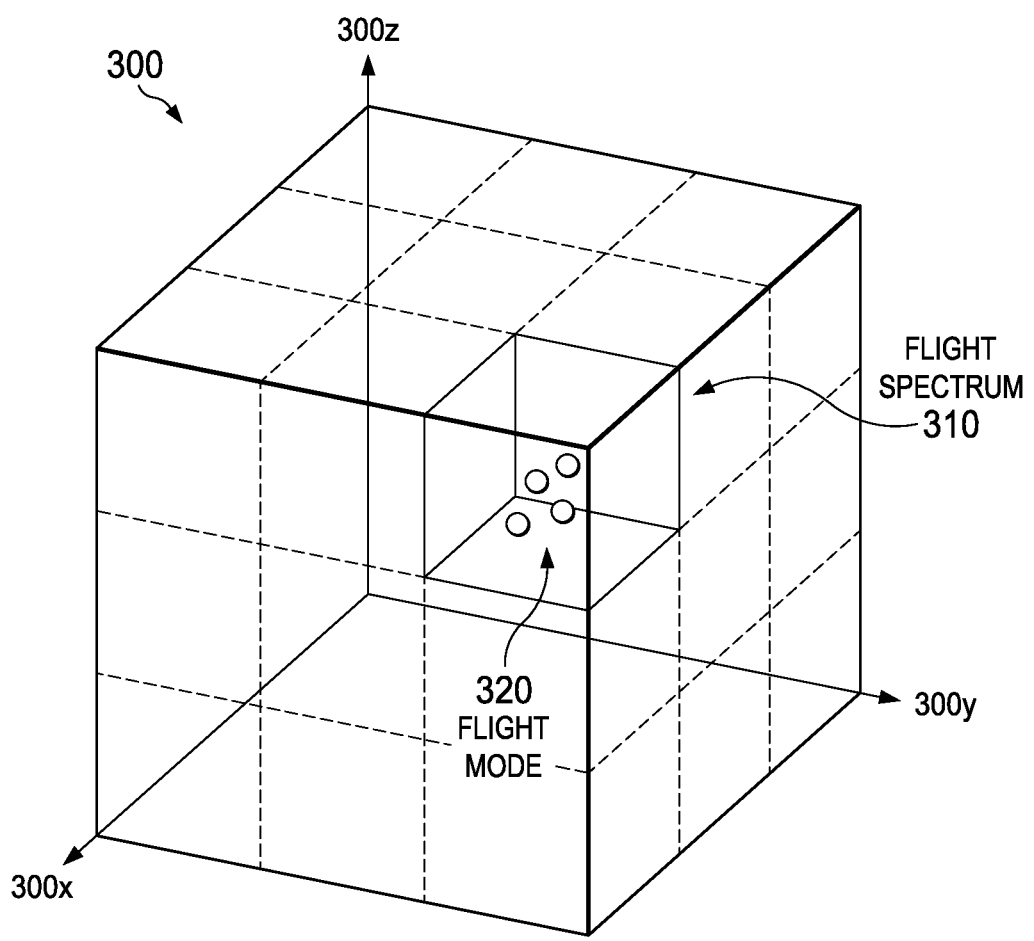
FIG. 3 shows an example representation of flight modes of an aircraft such as the rotorcraft of FIG. 1 plotted against three flight parameters.

FIG. 3 shows an example representation 300 of flight modes plotted against three flight parameters. In the example of FIG. 3, flight modes 320 are plotted against flight parameters 300x, 300y, and 300z. In this example, the graphical volume of representation 300 is divided into multiple flight spectrums 310. Each flight spectrum 310 may contain zero, one, or multiple flight modes 320.

Teachings of certain embodiments recognize the ability to estimate flight modes by identifying a flight spectrum based on know flight parameters. In the example of FIG. 3, a specific flight spectrum 310 may be identified if flight parameters 300x, 300y, and 300z. Once the specific flight spectrum 310 is known, a list of potential flight modes may be reduced to those flight modes corresponding to the identified flight spectrum 310.

As explained above, each flight mode may result in a certain amount of stress being applied to the aircraft. Teachings of certain embodiments recognize the capability to define health profiles for each flight spectrum 310. A health profile may describe how operating within a certain flight spectrum 310 affects the health of an aircraft. In one example, each health profile may include a damage rate (e.g., 0.005 damage per 100 hours) that describes how much damage the aircraft suffers as a function of time spent within the corresponding flight spectrum. In some embodiments, a health profile may describe how operating within a certain flight spectrum 310 affects the health of one or more parts associated with an aircraft.

These health profiles defined for each flight spectrum 310 may correspond to or be based in part on the flight modes 320 within each flight spectrum 310. For example, if a certain flight spectrum 310 includes three potential flight modes 320, the health profile for that flight spectrum may reflect an averaged scenario (e.g., the average affect on aircraft health based on the three potential flight modes 320) or a worst-case health scenario (e.g., the most stressful of the three potential flight modes or a worst-case combination of the three potential flight modes).

Accordingly, teachings of certain embodiments recognize the capability to estimate changes in health of an aircraft (and/or its parts) without specifically identifying which flight modes the aircraft has been operating in. For example, using flight parameters to identify a flight spectrum having a defined health profile may eliminate the need to identify a specific flight mode within the flight spectrum. Teachings of certain embodiments recognize that identifying a flight spectrum may require less measurements and resources than identifying a specific flight mode.

In the example representation 300, flight spectrums are identified based on three flight parameters. Teachings of certain embodiments recognize that more or fewer flight parameters may be used. The optimal number of flight parameters may different for different aircraft and the accuracy required. Increasing the number of parameters used may improve accuracy (by, for example, increasing the number of flight spectrums) but at the cost of efficiency and resources.

Figure 4:
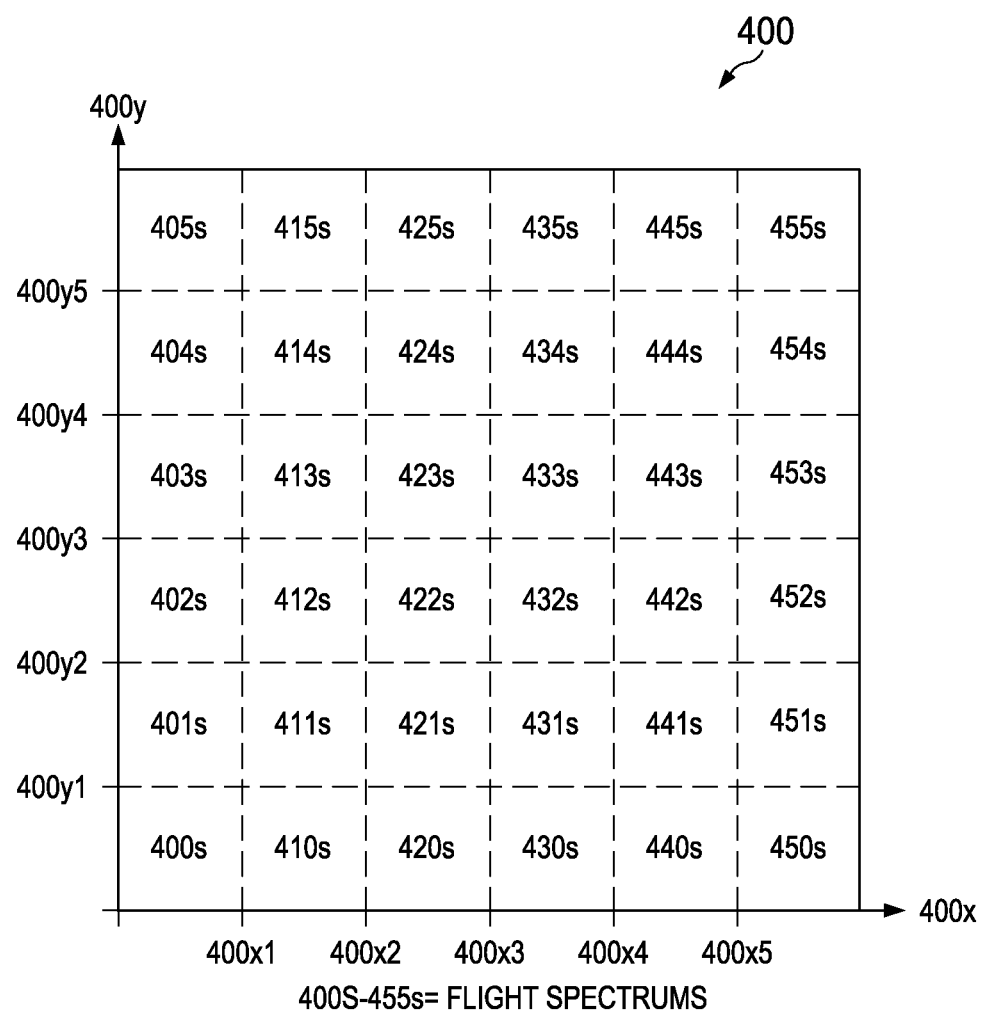
FIG. 4 shows an example representation of flight spectrums based on two flight parameters.

FIG. 4 shows an example representation 400 of flight spectrums based on two flight parameters. Although more flight parameters may be used, some concepts may be best understood by discussing just two flight parameters. In the example of FIG. 4, a specific spectrum may be identified out of flight spectrums 400s-455s based on flight parameters 400x and 400y.

As explained above, identifying a specific flight spectrum based on flight parameters may allow the effect on aircraft health to be estimated for the time spent in a specific flight spectrum. For example, the change in health of an aircraft (and/or its parts) that operates in flight spectrum 432s for ten minutes may be estimated based on the health profile corresponding to flight spectrum 432s.

Most, if not all aircraft, however, do not stay in one flight spectrum during its lifetime. Rather, aircraft regularly (if not quickly) transition from flight spectrum to flight spectrum. Teachings of certain embodiments recognize that estimating a change in aircraft health based on the amount of time spent in each flight spectrum may not appropriately represent the change in aircraft health due to transitions between flight spectrums. Using a car by analogy, performing a u-turn at ten miles-per-hour may have a different impact on health of the car than performing a u-turn at sixty miles-per-hour.

Figure 5:
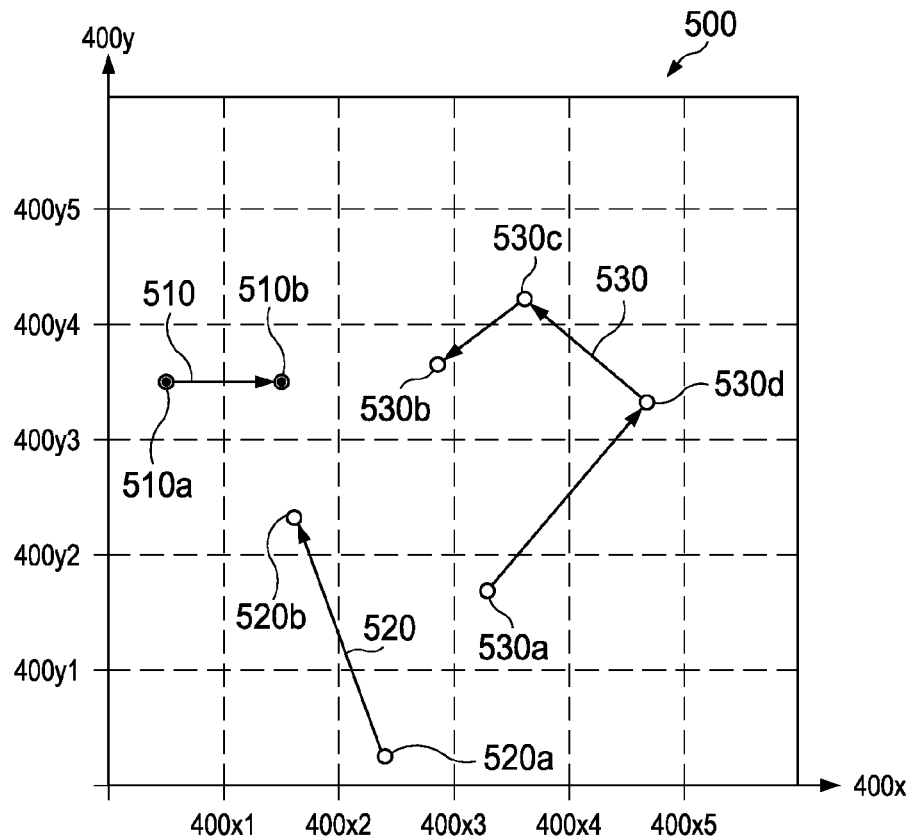
FIG. 5 shows an example representation of transitions between the flight spectrums of FIG. 4.

FIG. 5 shows an example representation 500 of transitions between the flight spectrums 400s-455s of FIG. 4. The example of FIG. 5 shows example transitions 510 and 520 as well as an example maneuver 530, which will be described in greater detail below.

Transitions may be identified in any suitable manner. In one example embodiment, a transition is identified with at least one flight parameters changes to an extent that the aircraft is in a new flight spectrum. In some embodiments, as will be explained in greater detail below, timestamping or other techniques may be used to identify how quickly transitions occur. For example, slower transitions may be analyzed independently, whereas faster transitions across multiple flight spectrums may be identified as a single transition or maneuver.

In the example of transition 510, the aircraft transitions from a flight mode 510a within flight spectrum 403s to a flight mode 510b within flight spectrum 413s. Teachings of certain embodiments recognize the capability to define transition health profiles for known transitions between flight spectrums and to estimate a change in health of the aircraft due to transitions based on the defined transition health profiles. In this example, a change in aircraft health due to transition 510 may be estimated based on the transition health profile defined for a transition from flight spectrum 403s to 413s.

In the example of transition 520, the aircraft transitions from a flight mode 520a within flight spectrum 420s to a flight mode 520b within flight spectrum 412s. In this example, the aircraft presumably and/or actually passes through flight spectrums 411s and 421s when transitioning from flight spectrum 420s to flight spectrum 412s. Although transition 520 may be analyzed as multiple transitions, teachings of certain embodiments recognize the capability to analyze movement from flight spectrum 420s to flight spectrum 412s if, for example, the transition is completed within a minimum time requirement. In this example, a change in aircraft health due to transition 520 may be estimated based on the transition health profile defined for a transition from flight spectrum 420s to 412s.

The example of maneuver 530 includes multiple transitions. In this example, the aircraft transitions from a flight mode 530a within flight spectrum 431s to a flight mode 530b within flight spectrum 443s to a flight mode 530c within flight spectrum 434s to a flight mode 530d within flight spectrum 423s. These transitions may be analyzed as a single maneuver if, for example, the transitions occur within a minimum time requirement. Teachings of certain embodiments recognize that identifying multiple transitions as a single maneuver may result in a more accurate health assessment. Returning to the car analogy, an s-curve maneuver may result in a greater impact on the health of the car than two separate left and right hand turns.

In the examples of FIGS. 3-5, each flight spectrum is shown as being the same size. Teachings of certain embodiments recognize, however, the ability to improve health assessment accuracy and efficiency by optimizing the size of each flight spectrum.

Figure 6:
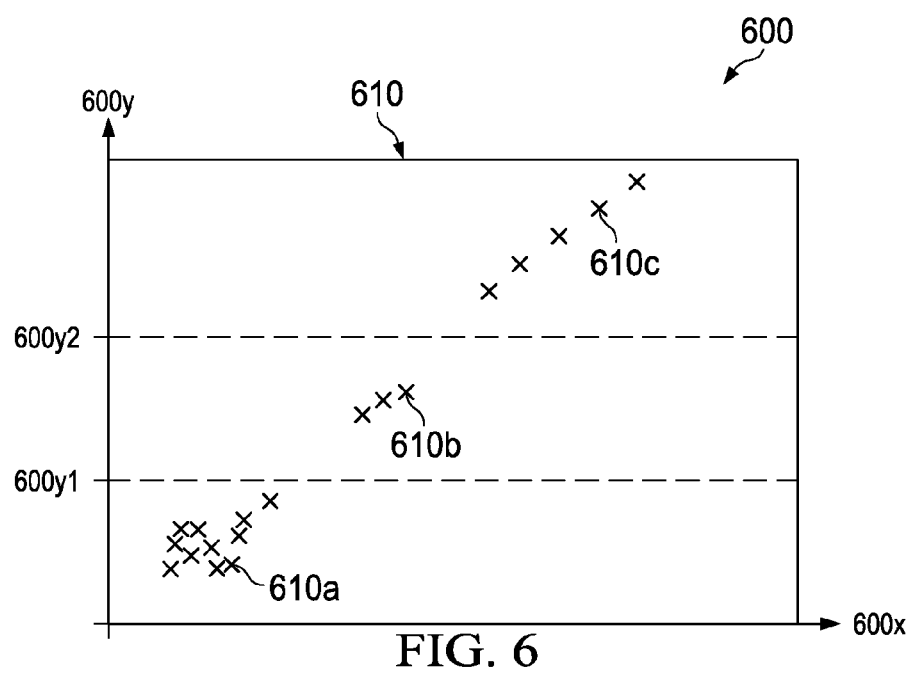
FIG. 6 shows an example graph of load data for a specific parameter.

FIG. 6 shows an example graph 600 of load data 610 for a specific parameter. Load data 610 may be representative of aircraft stress and/or change in health of an aircraft. In this example, load value is plotted along axis 600x, and flight parameter value for a specific parameter is plotted along axis 600y. This load data 610 may be based, for example, on data collected during experimental flights of an aircraft.

As seen in graph 600, load data 610 appears to cluster around three locations on graph 600. These three clusters are labeled as clusters 610a, 610b, and 610c in FIG. 6. Teachings of certain embodiments recognize the capability to define flight spectrums based on this clustering of data. In the example of FIG. 6, two flight spectrum boundaries are defined at parameter values 600y1 and 600y2.

In the examples of FIGS. 3-6, flight spectrums are defined by one or multiple flight parameters. If all flight parameters are known, these flight spectrums may be easily identified. Teachings of certain embodiments recognize, however, that some flight parameters may be more indicative of aircraft health than other flight parameters. Returning to the example of FIG. 6, the flight parameter of axis 600y appears highly indicative of aircraft load (and therefore aircraft health) because of how load data 610 is clustered. Knowing the value of this flight parameter may eliminate many load values 610 as possibilities even without the help of other flight parameters. For example, if the value of the flight parameter is greater than 600y2, then load value clusters 610a and 620b are eliminated as possible load values regardless of what the other flight parameter values may be. Therefore, teachings of certain embodiments recognize that prioritizing flight parameters may allow for flight spectrums (and therefore health profiles) to be identified more quickly.

Figure 7:
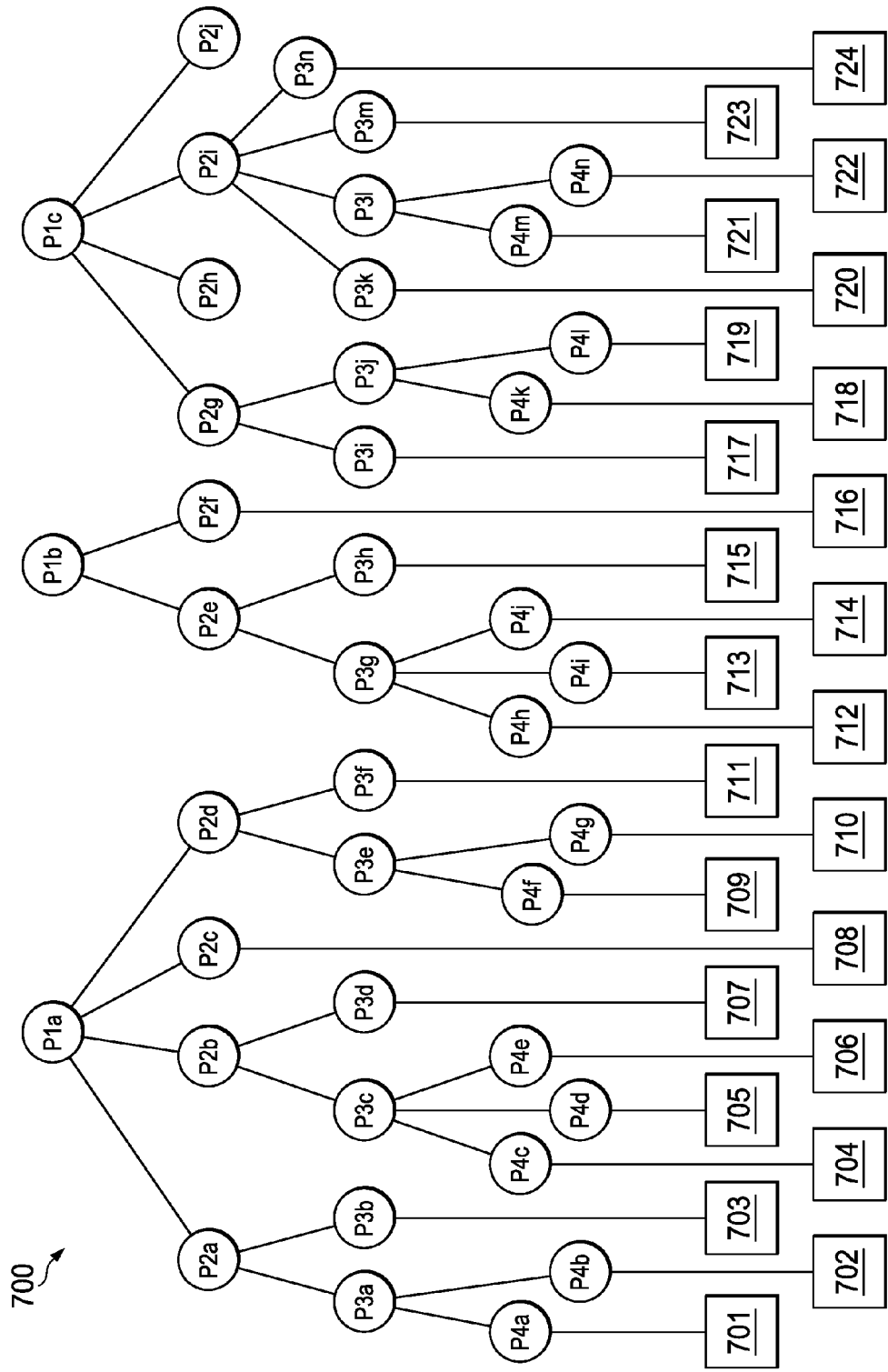
FIG. 7 shows an example flow chart based on prioritized flight parameters.

FIG. 7 shows an example flow chart 700 based on prioritized flight parameters. In the example flow chart 700, four flight parameters (P1, P2, P3, and P4) may be used to identify a flight spectrum out of flight spectrums 701-724. In this example, flight parameters P1, P2, P3, and P4 are prioritized in order of P1 to P4. Thus, the process of identifying a flight spectrum may begin by determining the value of P1.

In the example of FIG. 7, flight parameter P1 may fall into one of three flight parameter value categories P1a, P1b, and P1c. If, for example, categories P1a, P1b, and P1c are based on the data shown in FIG. 6, the categories could be defined as follows: category P1a applies if P1 is less than or equal to $600y1$; category P1b applies if P1 is greater than $600y1$ but less than or equal to $600y2$; and category P1c applies if P1 is greater than $600y2$.

As with the example of FIG. 6, knowing the value of flight parameter P1 in FIG. 7 may eliminate several flight spectrums (or health profiles). For example, if the value of flight parameter P1 falls within category P1a, then flight spectrums 712-724 are eliminated as possibilities.

Continuing down flow chart 700, the value of parameter P2 may further narrow down potential flight spectrums. Similarly, the values of flight parameters P3 and P4 may narrow down potential flight spectrums until only one possible flight spectrum remains.

In some examples, however, one specific flight spectrum may be identified without using all four flight parameters. For example, if flight parameter P1 falls within category P1a and flight parameter P2 falls within category P2c, then the flight spectrum may be identified as flight spectrum 708. In this example, flight spectrum 708 may be defined as a function of flight parameters P1 and P2 only, and the values of flight parameters P3 and P4 are not necessary. Rather, in this example, the values of flight parameters P1 and P2 indicate that the aircraft is operating in flight spectrum 708 regardless of the values of flight parameters P3 and P4, and changes in the values of flight parameters P3 and P4 do not result in a transition out of flight spectrum 708.

Figure 8:
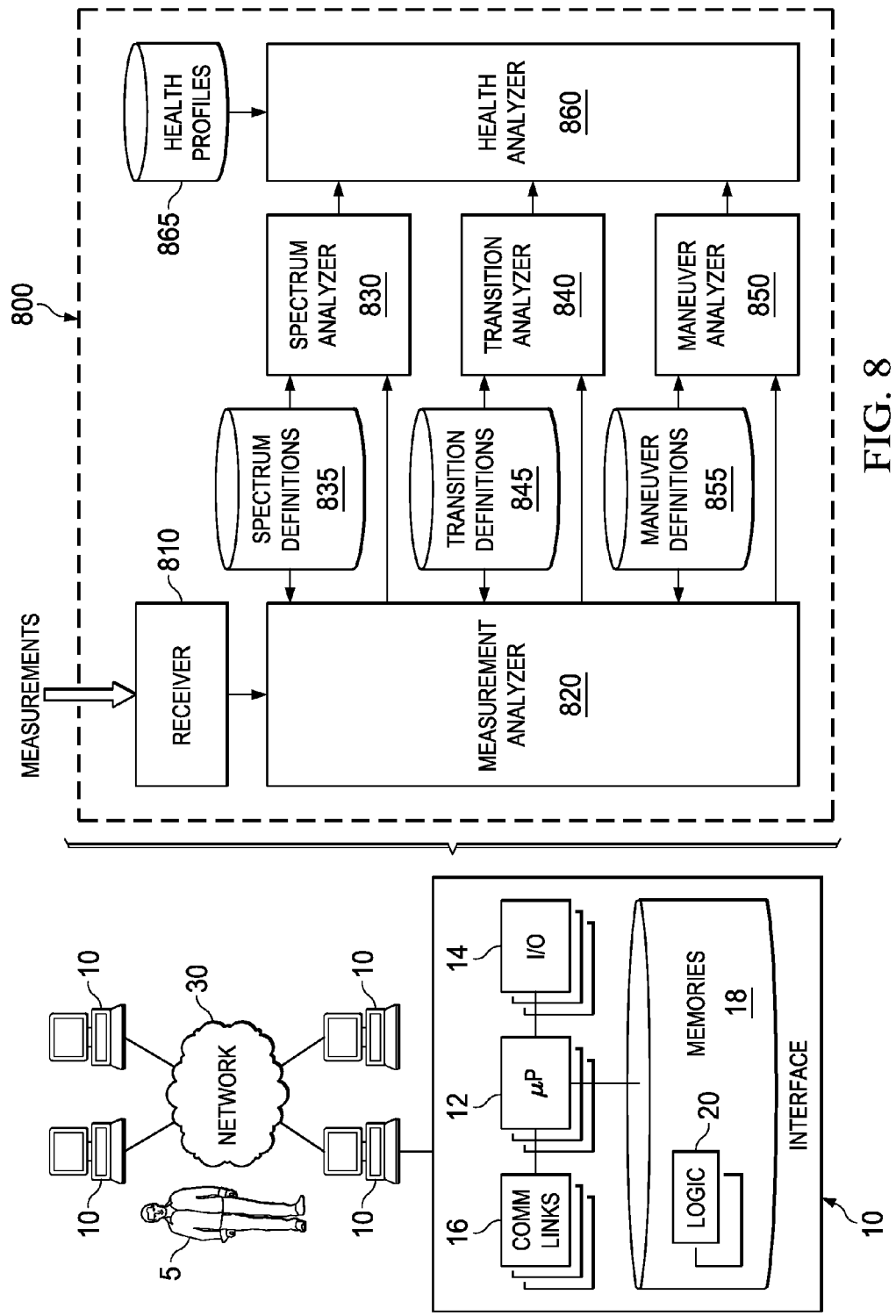
FIG. 8 shows an example system for assessing health of an aircraft such as the rotorcraft of FIG. 1.

FIG. 8 shows an example system 800 for assessing health of an aircraft. In the example of FIG. 8, system 800 features a receiver 810, a measurement analyzer 820, a spectrum analyzer 830, a transition analyzer 840, a maneuver analyzer 850, and a health analyzer 860, which may be implemented by one or more computers 10 and may be accessed by a user 5. In operation, system 800 may consult information stored in spectrum definition repository 835, transition definition repository 845, maneuver definition repository 855, and health profile repository 865.

Users 5 may access system 800 through computer systems 10. For example, in some embodiments, users 5 may access data stored in spectrum definition repository 835, transition definition repository 845, maneuver definition repository 855, and health profile repository 865. In another example, users 5 may receive outputs from health analyzer 860. Users 5 may include any individual, group of individuals, entity, machine, and/or mechanism that interacts with computer systems 10. Examples of users 5 include, but are not limited to, a service person, pilot, engineer, technician, contractor, agent, and/or employee. Users 5 may be associated with an organization. An organization may include any social arrangement that pursues collective goals. One example of an organization is a business. A business is an organization designed to provide goods or services, or both, to consumers, governmental entities, and/or other businesses.

Computer system 10 may include processors 12, input/output devices 14, communications links 16, and memory 18. In other embodiments, computer system 10 may include more, less, or other components. Computer system 10 may be operable to perform one or more operations of various embodiments. Although the embodiment shown provides one example of computer system 10 that may be used with other embodiments, such other embodiments may utilize computers other than computer system 10. Additionally, embodiments may also employ multiple computer systems 10 or other computers networked together in one or more public and/or private computer networks, such as one or more networks 30.

Processors 12 represent devices operable to execute logic contained within a medium. Examples of processor 12 include one or more microprocessors, one or more applications, and/or other logic. Computer system 10 may include one or multiple processors 12.

Input/output devices 14 may include any device or interface operable to enable communication between computer system 10 and external components, including communication with a user or another system. Example input/output devices 14 may include, but are not limited to, a mouse, keyboard, display, and printer.

Network interfaces 16 are operable to facilitate communication between computer system 10 and another element of a network, such as other computer systems 10. Network interfaces 16 may connect to any number and combination of wireline and/or wireless networks suitable for data transmission, including transmission of communications. Network interfaces 16 may, for example, communicate audio and/or video signals, messages, internet protocol packets, frame relay frames, asynchronous transfer mode cells, and/or other suitable data between network addresses. Network interfaces 16 connect to a computer network or a variety of other communicative platforms including, but not limited to, a public switched telephone network (PSTN); a public or private data network; one or more intranets; a local area network (LAN); a metropolitan area network (MAN); a wide area network (WAN); a wireline or wireless network; a local, regional, or global communication network; an optical network; a satellite network; a cellular network; an enterprise intranet; all or a portion of the Internet; other suitable network interfaces; or any combination of the preceding.

Memory 18 represents any suitable storage mechanism and may store any data for use by computer system 10. Memory 18 may comprise one or more tangible, computer-readable, and/or computer-executable storage medium. Examples of memory 18 include computer memory (for example, Random Access Memory (RAM) or Read Only Memory (ROM)), mass storage media (for example, a hard disk), removable storage media (for example, a Compact Disk (CD) or a Digital Video Disk (DVD)), database and/or network storage (for example, a server), and/or other computer-readable medium.

In some embodiments, memory 18 stores logic 20. Logic 20 facilitates operation of computer system 10. Logic 20 may include hardware, software, and/or other logic. Logic 20 may be encoded in one or more tangible, non-transitory media and may perform operations when executed by a computer. Logic 20 may include a computer program, software, computer executable instructions, and/or instructions capable of being executed by computer system 10. Example logic 20 may include any of the well-known OS2, UNIX, Mac-OS, Linux, and Windows Operating Systems or other operating systems. In particular embodiments, the operations of the embodiments may be performed by one or more computer readable media storing, embodied with, and/or encoded with a computer program and/or having a stored and/or an encoded computer program. Logic 20 may also be embedded within any other suitable medium without departing from the scope of the invention.

Various communications between computers 10 or components of computers 10 may occur across a network, such as network 30. Network 30 may represent any number and combination of wireline and/or wireless networks suitable for data transmission. Network 30 may, for example, communicate internet protocol packets, frame relay frames, asynchronous transfer mode cells, and/or other suitable data between network addresses. Network 30 may include a public or private data network; one or more intranets; a local area network (LAN); a metropolitan area network (MAN); a wide area network (WAN); a wireline or wireless network; a local, regional, or global communication network; an optical network; a satellite network; a cellular network; an enterprise intranet; all or a portion of the Internet; other suitable communication links; or any combination of the preceding. Although the illustrated embodiment shows one network 30, teachings of certain embodiments recognize that more or fewer networks may be used and that not all elements may communicate via a network. Teachings of certain embodiments also recognize that communications over a network is one example of a mechanism for communicating between parties, and any suitable mechanism may be used.

Receiver 810 may receive measurements of flight profiles for an aircraft. In one example embodiment, receiver 810 receives the measurements from measurement sensors associated with the aircraft. Receiver 810 may be located on or off an aircraft. For example, in some embodiments, receiver 810 is located on an aircraft and is in communication with a physical storage device also located on the aircraft. This physical storage device may store measurements of flight parameters for later processing.

Measurement analyzer 820 receives and processes measurements from receiver 810. In one example embodiment, measurement analyzer 820 identifies transitions and maneuvers based on the received measurements. In this example embodiment, measurement analyzer 820 sends measurements associated with identified transitions to transition analyzer 840 and the measurements associated with identified maneuvers to maneuver analyzer 850. In this example, measurement analyzer 820 may send measurements associated with time spent within particular flight spectrums to spectrum analyzer 830 (e.g., measurements associated with the time between identified transitions and maneuvers).

In some embodiments, measurement analyzer 820 may identify flight spectrum segments, transitions, and maneuvers by organizing the measurements into multiple time segments. Each time segment may be of any suitable length. Next, measurement analyzer 820 may identify each time segment as representative of a flight spectrum segment, a transition, or a combination. If the time segment is representative of a combination of, for example, a transition and a flight spectrum segment, measurement analyzer 820 may divide the time segment into smaller time segments and repeat its analysis.

Spectrum analyzer 830 identifies flight spectrums based on measurements received from measurement analyzer 820. In the example of FIG. 8, spectrum analyzer 830 identifies each flight spectrum based on a comparison of the received measurements to flight spectrum definitions stored in spectrum definition repository 835. Spectrum analyzer 830 may also identify an amount of time the aircraft spends in each flight spectrum. In some embodiments, spectrum analyzer 830 may provide a total report of time spent in each flight spectrum across the entire set of data received by receiver 810 (or a subset of that data). For example, spectrum analyzer 830 may report that an aircraft has spent three total hours in a particular flight spectrum if, according to the received measurements, the aircraft spent one hour in that particular flight spectrum in three different missions.

Transition analyzer 840 identifies flight transitions based on measurements received from measurement analyzer 820. In the example of FIG. 8, transition analyzer 840 identifies each flight transition based on a comparison of the received measurements to flight transition definitions stored in transition definition repository 845. Transition analyzer 840 may identify a number of times each flight transition occurred. In some embodiments, transition analyzer 840 may provide a total report of the number of flight transitions across the entire set of data received by receiver 810 (or a subset of that data). For example, transition analyzer 840 may report that a particular transition has occurred six times if, according to the received measurements, the particular transition occurred twice on three different missions.

Maneuver analyzer 850 identifies flight maneuvers based on measurements received from measurement analyzer 820. In the example of FIG. 8, maneuver analyzer 850 identifies each flight maneuver based on a comparison of the received measurements to flight maneuver definitions stored in maneuver definition repository 855. Maneuver analyzer 850 may identify a number of times each flight maneuver occurred. In some embodiments, maneuver analyzer 850 may provide a total report of the number of flight maneuvers across the entire set of data received by receiver 810 (or a subset of that data). For example, maneuver analyzer 850 may report that a particular maneuver has occurred six times if, according to the received measurements, the particular maneuver occurred twice on three different missions.

Health analyzer 860 estimates a change in health of an aircraft based on the flight spectrum times, transitions, and maneuvers identified by spectrum analyzer 830, transition analyzer 840, and maneuver analyzer 850. For example, health analyzer 860 may estimate the change in health of an aircraft due to time spent in each flight spectrum based on the determination of the amount of time the aircraft spent in each flight spectrum and based on spectrum health profiles stored in health profile repository 865. Each spectrum health profile may describe how operating within a certain flight spectrum affects the health of an aircraft.

As another example, health analyzer 860 may estimate the change in health of an aircraft due to transitions based on the determination of the number of transitions and based on transition health profiles stored in health profile repository 865. Each transition health profile may describe how a certain transition affects the health of an aircraft.

As yet another example, health analyzer 860 may estimate the change in health of an aircraft due to maneuvers based on the determination of the number of maneuvers and based on maneuver health profiles stored in health profile repository 865. Each maneuver health profile may describe how a certain maneuver affects the health of an aircraft.

As yet another example, health analyzer 860 may estimate the change in health of an aircraft based on multiple determinations. For example, health analyzer 860 may estimate the change in health of an aircraft based on the time spent in each flight spectrum, the transitions that have occurred, and/or the maneuvers performed. In one example embodiment, the overall change in health of an aircraft may be equal to the sum of health changes due to time spent in each flight spectrum, the transitions that have occurred, and/or the maneuvers performed.

Modifications, additions, or omissions may be made to the systems and apparatuses described herein without departing from the scope of the invention. The components of the systems and apparatuses may be integrated or separated. Moreover, the operations of the systems and apparatuses may be performed by more, fewer, or other components. The methods may include more, fewer, or other steps. Additionally, steps may be performed in any suitable order.

Although several embodiments have been illustrated and described in detail, it will be recognized that substitutions and alterations are possible without departing from the spirit and scope of the present invention, as defined by the appended claims.

To aid the Patent Office, and any readers of any patent issued on this application in interpreting the claims appended hereto, applicants wish to note that they do not intend any of the appended claims to invoke paragraph 6 of 35 U.S.C. §112 as it exists on the date of filing hereof unless the words "means for" or "step for" are explicitly used in the particular claim.

What is claimed is:

1. A system for assessing health of a rotorcraft, comprising:
   a rotorcraft comprising a body, a power train coupled to the body and comprising a power source and a drive shaft coupled to the power source, a hub, a rotor blade coupled to the hub, and one or more flight measurement sensors operable to provide a plurality of measurements associated with two or more flight parameters, the plurality of measurements comprising measurements spanning at least one period of time, the two or more flight parameters comprising a first parameter and a second parameter; and
   a health assessment system comprising:
      a flight spectrum analyzer operable to determine, based on a comparison of the plurality of measurements to a plurality of flight spectrum definitions, an amount of time the rotorcraft spent in each flight spectrum of a plurality of flight spectrums during the at least one period of time by:
         organizing the plurality of measurements spanning the at least one period of time into a plurality of time segments;
         eliminating, for each time segment, at least some flight spectrums based on the received measurements associated with the first flight parameter to yield a smaller subset of potential flight spectrums; and
         assigning each time segment to a flight spectrum within the smaller subset of potential flight spectrums based on the measurements associated with the second flight parameter; and
      a health assessment analyzer operable to assess a change in health of the rotorcraft over the at least one period of time based on the determination of the amount of time the rotorcraft spent in each flight spectrum and a plurality of spectrum health profiles, each spectrum health profile defined for a corresponding flight spectrum.

2. The system of claim 1, further comprising a flight transition analyzer operable to identify, based on the received plurality of measurements, one or more transitions between flight spectrums, the health assessment analyzer further operable to assess the change in health of the rotorcraft further based on the identified transitions and a plurality of transition health profiles, each transition health profile defined for a corresponding transition.

3. The system of claim 1, further comprising a flight maneuver analyzer operable to identify, based on the received plurality of measurements, one or more rotorcraft maneuvers between flight spectrums, each rotorcraft maneuver comprising at least a first transition from a first flight spectrum to a second flight spectrum and a second transition from the second flight spectrum to a third flight spectrum, the health assessment analyzer further operable to assess the change in health of the rotorcraft further based on the identified maneuvers and a plurality of maneuver health profiles, each maneuver health profile defined for a corresponding maneuver.

4. A system for assessing health of an aircraft, comprising:
   a receiver operable to receive, from an aircraft, a plurality of measurements associated with two or more flight parameters, the plurality of measurements comprising measurements spanning at least one period of time, the two or more flight parameters comprising a first parameter and a second parameter;
   a flight spectrum analyzer operable to determine, based on a comparison of the plurality of measurements to a plurality of flight spectrum definitions, an amount of time the aircraft spent in each flight spectrum of a plurality of flight spectrums during the at least one period of time by:
      organizing the plurality of measurements spanning the at least one period of time into a plurality of time segments;
      eliminating, for each time segment, at least some flight spectrums based on the received measurements associated with the first flight parameter to yield a smaller subset of potential flight spectrums; and
      assigning each time segment to a flight spectrum within the smaller subset of potential flight spectrums based on the measurements associated with the second flight parameter; and
   a health assessment analyzer operable to assess a change in health of the aircraft over the at least one period of time based on the determination of the amount of time the aircraft spent in each flight spectrum and a plurality of spectrum health profiles, each spectrum health profile defined for a corresponding flight spectrum.

5. The system of claim 4, further comprising a flight transition analyzer operable to identify, based on the received plurality of measurements, one or more transitions between flight spectrums, the health assessment analyzer further operable to assess the change in health of the aircraft further based on the identified transitions and a plurality of transition health profiles, each transition health profile defined for a corresponding transition.

6. The system of claim 4, further comprising a flight maneuver analyzer operable to identify, based on the received plurality of measurements, one or more aircraft maneuvers between flight spectrums, each aircraft maneuver comprising at least a first transition from a first flight spectrum to a second flight spectrum and a second transition from the second flight spectrum to a third flight spectrum, the health assessment analyzer further operable to assess the change in health of the aircraft further based on the identified maneuvers and a plurality of maneuver health profiles, each maneuver health profile defined for a corresponding maneuver.

7. The system of claim 6, wherein the flight maneuver analyzer is operable to identify the one or more aircraft maneuvers by:
   identifying the first transition and the second transition;
   determining an amount of time elapsed between the first transition and the second transition; and
   identifying the first and second transitions as an aircraft maneuver if the amount of time elapsed is less than a predetermined time value.

8. The system of claim 7, wherein a plurality of predetermined time values is defined, each predetermined time value of the plurality being defined for a corresponding aircraft maneuver.

9. The system of claim 4, wherein the flight spectrum analyzer is further operable to determine the amount of time the aircraft spends in each flight spectrum by
determining the amount of time the aircraft spent in each flight spectrum of the plurality of flight spectrums during the at least one period of time based on the length of each time segment and the flight spectrum to which each time segment is assigned.

10. The system of claim 4, wherein each time segment is assigned to only one flight spectrum.

11. The system of claim 4, wherein the flight spectrum analyzer is further operable to assign each time segment to a flight spectrum of the plurality of flight spectrums by identifying a prioritized order of the two or more flight parameters, the two or more flight parameters comprising the first flight parameter and the second flight parameter having a lower priority than the first flight parameter.

12. A method of assessing health of an aircraft, comprising:
receiving a plurality of measurements of two or more flight parameters, the plurality of measurements comprising measurements spanning at least one period of time, the two or more flight parameters comprising a first parameter and a second parameter;
determining, based on a comparison of the plurality of measurements to a plurality of flight spectrum definitions, an amount of time the aircraft spent in each flight spectrum of a plurality of flight spectrums during the at least one period of time by:
organizing the plurality of measurements spanning the at least one period of time into a plurality of time segments;
eliminating, for each time segment, at least some flight spectrums based on the received measurements associated with the first flight parameter to yield a smaller subset of potential flight spectrums; and
assigning each time segment to a flight spectrum within the smaller subset of potential flight spectrums based on the measurements associated with the second flight parameter;
assessing a change in health of the aircraft over the at least one period of time based on the determination of the amount of time the aircraft spent in each flight spectrum and a plurality of spectrum health profiles, each spectrum health profile defined for a corresponding flight spectrum; and
instructing an aircraft maintainer to perform a maintenance action on the aircraft based on the change in health of the aircraft.

13. The method of claim 12, further comprising:
identifying, based on the received plurality of measurements, one or more transitions between flight spectrums, wherein assessing the change in health of the aircraft is further based on the identified transitions and a plurality of transition health profiles, each transition health profile defined for a corresponding transition.

14. The method of claim 13, wherein at least one identified transition represents transition of an aircraft from a first flight spectrum to a third flight spectrum by passing, at least in part, through a second flight spectrum.

15. The method of claim 12, further comprising:
identifying, based on the received plurality of measurements, one or more aircraft maneuvers, each aircraft maneuver comprising at least a first transition from a first flight spectrum to a second flight spectrum and a second transition from the second flight spectrum to a third flight spectrum, wherein assessing the change in health of the aircraft is further based on the identified aircraft maneuvers and a plurality of maneuver health profiles, each maneuver health profile defined for a corresponding aircraft maneuver.

16. The method of claim 15, wherein identifying the one or more aircraft maneuvers comprises:
identifying the first transition and the second transition;
determining an amount of time elapsed between the first transition and the second transition; and
identifying the first and second transitions as an aircraft maneuver if the amount of time elapsed is less than a predetermined time value.

17. The method of claim 16, wherein a plurality of predetermined time values is defined, each predetermined time value of the plurality being defined for a corresponding aircraft maneuver.

18. The method of claim 12, wherein determining an amount of time the aircraft spent in each flight spectrum further comprises
determining the amount of time the aircraft spent in each flight spectrum of the plurality of flight spectrums during the at least one period of time based on the length of each time segment and the flight spectrum to which each time segment is assigned.

19. The method of claim 12, wherein each time segment is assigned to only one flight spectrum.

20. The method of claim 12, wherein assigning each time segment to a flight spectrum of the plurality of flight spectrums comprises
identifying a prioritized order of the two or more flight parameters, the two or more flight parameters comprising the first flight parameter and the second flight parameter having a lower priority than the first flight parameter.

* * * * *